Aug. 22, 1950 M. T. HUNSWORTH Re. 23,257

CONTAINER

Original Filed July 22, 1946 3 Sheets-Sheet 1

Inventor:
Melvin T. Hunsworth
By: C. H. Seeley
Atty.

CONTAINER

Original Filed July 22, 1946 3 Sheets-Sheet 2

Inventor:
Melvin T. Hunsworth
By: C. H. Seeley
Atty

CONTAINER

Original Filed July 22, 1946 3 Sheets-Sheet 3

Inventor:
Melvin T. Hunsworth
By: C. H. Seeley
Atty.

Reissued Aug. 22, 1950

Re. 23,257

UNITED STATES PATENT OFFICE 23,257

CONTAINER

Melvin T. Hunsworth, Collegeville, Pa., assignor to Container Corporation of America, Chicago, Ill., a corporation of Delaware Original No. 2,488,194, dated November 15, 1949, Serial No. 685,435, July 22, 1946. Application for reissue May 2, 1950, Serial No. 159,638

14 Claims. (Cl. 229—23)

Matter enclosed in heavy brackets [ ] appears in the original patent but forms no part of this reissue specification; matter printed in italics indicates the additions made by reissue

This invention relates to a box or container of paperboard or the like, which is rigid and capable of sustaining loads of considerable magnitude, but which may be opened readily by means of a rip cord anchored by means integrally formed with the container. The invention is preferably incorporated in a container known in the trade as the Bliss type, but its application is not limited to this type of container. A container embodying the invention is formed with cover flaps on one pair of opposite side walls of such size and shape as to abut against each other and against the adjacent walls upon closing of a box, so as to serve as bracing means for rigidifying the box and preventing "weaving" thereof. The cover flaps are provided with side flanges the ends of which serve to clamp the rip cord against the interior surface of the container adjacent the flap hinge line. The cord is so disposed in the container that only a single thickness of the container material lies between it and the exterior of the box, so that upon pulling of a protruding end of the cord only the single thickness of material need be severed in order to open the box. Outer cover flaps are provided on other walls of the container which are secured to the inner cover flaps upon closing of the box, and supporting means for the inner flaps are provided within the container, the inner flaps being thus held in substantially a common plane and prevented from moving out of the abutting relation mentioned and also held against lateral movement relative to each other and to the walls of the container.

It is an object of the invention to provide a container of paperboard or the like which is substantially rigid and non-weaving, and provided with means for ready opening thereof. Another object is the provision of a container having integral means for anchoring a rip cord incorporated in the container. A further object is the provision of a container having means for bracing and rigidifying the same and for substantially preventing weaving thereof. It is also an object to provide a container in which cover flaps are formed to abut in closed position and secured against movement so as to brace the container and prevent weaving thereof. Still another object is to provide a container in which an opening rip cord is so arranged that only a single thickness of the container material need be severed thereby to open the container.

Other and further objects and features of the invention will be apparent to those skilled in the art from the following description and the appended drawings, which form a part thereof.

The container is formed of sheet material which is self-sustaining but capable of being folded, and which may be torn or severed. Paperboard is a preferred material because of its advantages from the standpoints of cost and availability, among others. The term "paperboard" is used in a broad generic sense to include fibrous materials partaking of the characteristics of paper, such as cardboard, fiberboard, and the like.

Figure 1:
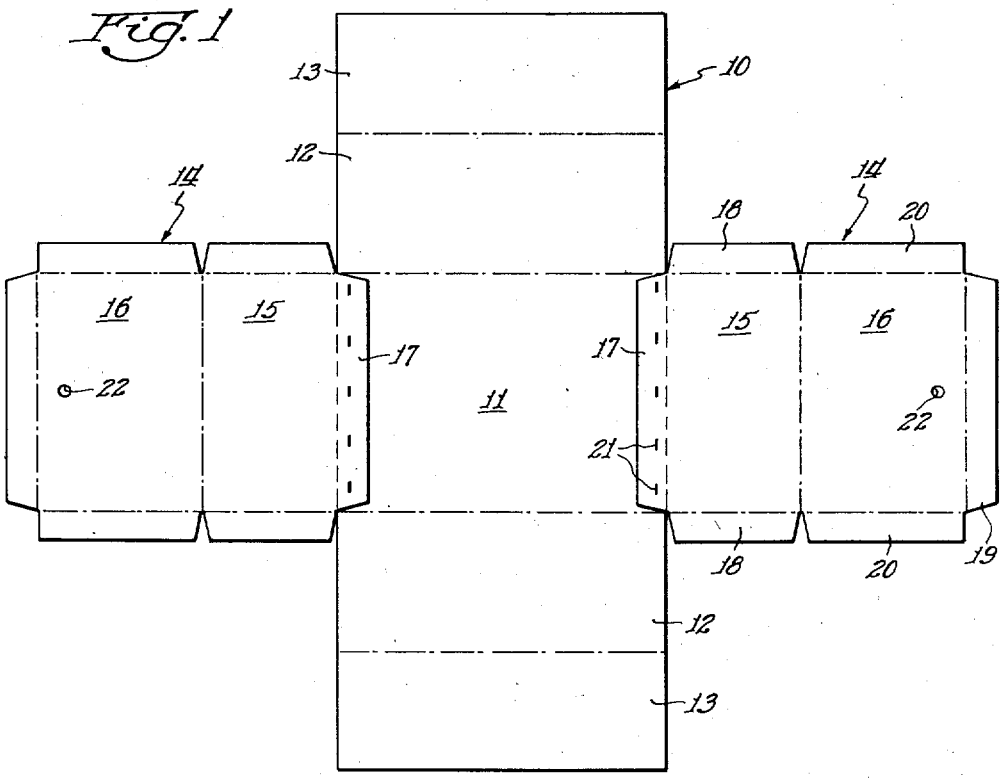
Figure 1 is a plan view of three blanks from which the container is formed secured together in an initial forming stage.
Figure 2:
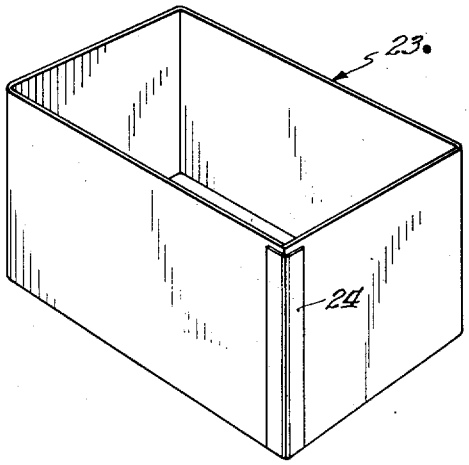
Figure 2 is a perspective view of a tubular supporting member which may be inserted in the container.
Figure 3:
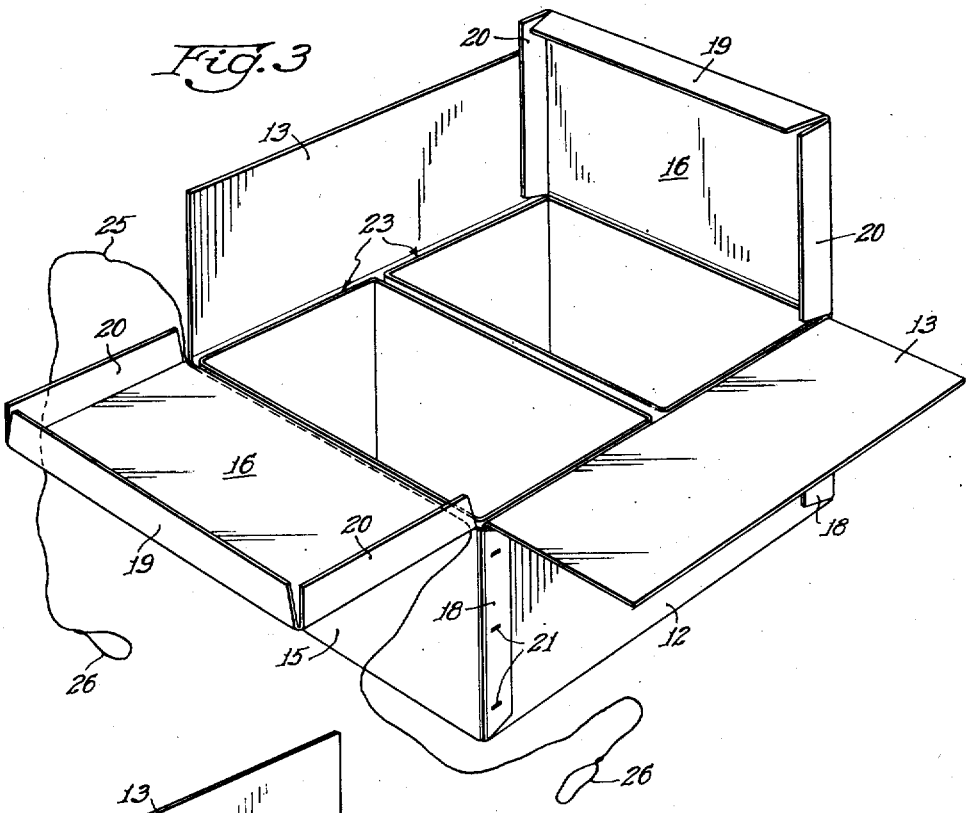
Figure 3 is a perspective view of the container in open position with the rip cord in the position assumed in an initital stage of its application.

The container in the form illustrated in Figures 1 to 6 inclusive is formed of a main blank 10 which provides a bottom 11, a pair of opposed side walls 12, and an outer cover flap 13 hinged on each wall 12. A pair of blanks 14 each providing an end wall 15 and an inner cover flap 16 are formed with a bottom flange 17 and a pair of side flanges 18 on each wall 15, and an end flange 19 and side flanges 20 on each flap 16. The flanges 17 and 18 of the walls 15 are secured to the bottom 11 and the side walls 12 by means of staples 21 or the like, as shown in Figures 1 and 3, to form the body of the box. The flaps 16 are of such dimensions as to abut each other when swung to closing position, and to extend from one side wall 12 to the other and abut thereagainst. The flanges 19 and 20 extend into the interior of the container in closed position of the flaps 16. Finger holes 22 may be provided in the flaps 16 to facilitate opening and closing thereof.

Of course, securing flanges might be provided on the bottom and side walls, instead of on the end walls, or other means may be used to secure the end walls in place. If desired, the end walls may be integral with the remainder of the container. The arrangement illustrated results in a strong, reinforced end wall construction.

Figure 4:
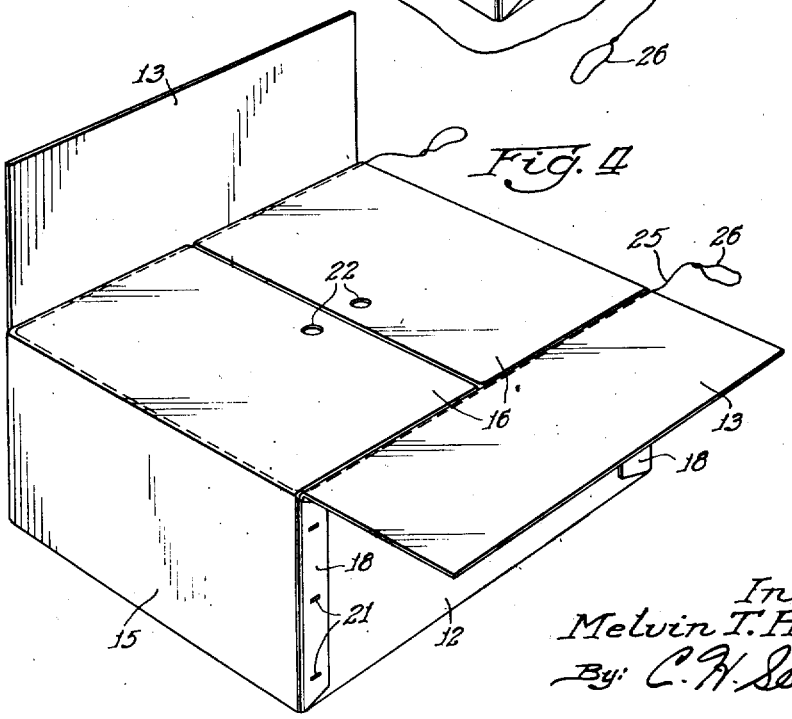
Figure 4 is a perspective view of the container with the inner flaps closed and the cord in the position assumed in the final stage of its application.
Figure 5:
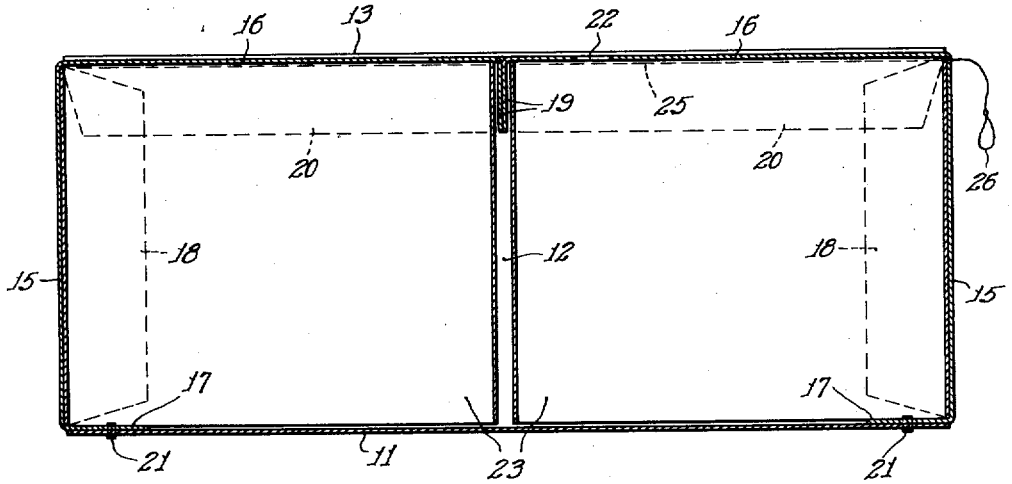
Figure 5 is a longitudinal vertical sectional view of the container in closed condition showing the positions of the various elements in the interior thereof.
Figure 6:
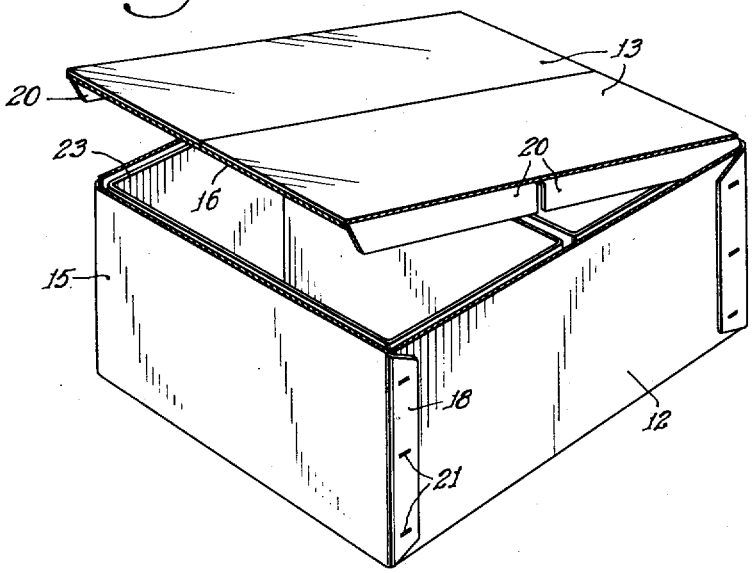
Figure 6 is a perspective view of the container after three of its walls have been severed to open the same.

Open-ended tubular members 23 are disposed in the container with the upper edges of the walls thereof serving to support the flaps 16. The tubular members 23 furthermore serve to reinforce the entire container, in effect providing double side walls therefor and resisting both lateral and vertical loads which may be applied thereto. The tubular members also provide compartments in the container. The members 23 may be of any suitable material, such as fiberboard, corrugated board, laminated board or the like and simply formed from a blank or strip of suitable size bent transversely at lines spaced to provide walls of the desired lateral dimensions, the vertical dimensions or height of the walls being determined by the width of the blank or strip. The ends of the strip are connected to form one corner of the member 23 in any suitable manner, as by means of a strip of tape 24. As best shown in Figures 3, 5 and 6, the members 23 are of such size that when disposed in the container a slight space is provided between each side wall 12 and the adjacent wall of a member 23, and a space is also provided between two of the tubular members. In Figures 3 to 6 the container is illustrated as having two substantially identical members 23 disposed therein, the flaps 16 also being substantially identical to each other and abutting centrally of the container. When the container is closed, each flap 16 is supported by one of the tubular members 23, the flanges 19 extending between the tubular members, and the flanges 20 extending between the side walls 12 and the tubular members. Preferably the flanges are frictionally engaged with the tubular members, and thus serve to hold the members 23 against shifting within the container and at the same time provide with the container walls and the walls of the tubular members a triple thickness of material adjacent the top of the container which further serves to reinforce and rigidify the container. It will be clear that the frictional engagement of the flanges also aids in preventing shifting of the flaps 16, so that they are maintained in the abutting and bracing relation described above. The outer cover flaps 13 on the side walls 12 overlie the flaps 16 in closed position and are secured thereto by any suitable means, such as adhesive. The flaps 16 are thus held in substantially a common plane between the tubular members 23 and the flaps 13 so that their abutting edges are prevented from moving out of abutment. At the same time, the securement of the outer and inner flaps holds them against movement both laterally and vertically. This construction and arrangement therefore substantially prevents weaving of the container. It will be understood that only a single flap 13 extending the full width of the container may be provided, or two such flaps may be used, if desired, instead of the two flaps each extending substantially half the width of the container as shown in the drawings.

The tubular members may be of different sizes and shapes, and the flaps 16 correspondingly altered so that the flanges 19 may extend into the interior of the container. The number of tubes employed may, of course, also be varied as desired.

The invention is not limited to the use of flaps 16 with the flanges 19 and 20 thereon. For example, the flanges 19 may be omitted and the tubular members arranged in closely fitting relationship without regard to the provision of a space for the flanges. Thus the tubular members may have walls crossing the line of the abutting flap edges.

The construction so far described provides a very strong and rigid container by reason of the integral formation of the flaps 16 with the end walls 15, and the cooperation between the outer flaps, inner flaps, and tubular member, providing strength and bracing as explained above.

To provide means for readily opening the container, a rip cord 25 is provided. This cord 25 may be of any suitable material, such as cord, twine, wire, or the like, of suitable flexibility and strength. Suitable grasping means 26, such as a loop, pull ring, or knot, may be provided on one or both ends of the cord to extend out of the container, or the cord may be endless and a portion thereof extend out of the container to permit its being pulled for severing the walls. No special means need be provided with this invention to anchor the cord 25 against slipping during the severing operation. The flanges 20 terminate at one end adjacent the hinge line of their flap 16 and clamp the rip cord 25 against the interior of the container adjacent the hinge line when the flap is swung to closing position. The remainder of the cord is disposed along the hinge lines of the flaps 13, with at least one end extending out of the container.

The rip cord may be quickly and easily assembled with the container simply by holding one of the flaps 16 in open position, as shown in Figure 3, and laying an intermediate portion of the cord along the hinge line, a part of the cord extending beyond each side of the flap, or in other words beyond the ends of the flanges 20. The flap is then swung to closed position with the flaps 20 extending into the container as previously described, the ends of the flanges 20 pressing the cord tightly against the interior of the container adjacent the hinge line of the flap, as best shown in Figure 5, thus holding it securely so that it will not slip when the protruding end is pulled, but will sever the container. After flap 16 has been swung to closed position, the other flap 16 may similarly be closed and the end portions of the cord laid along the hinge lines of the outer flap 13. It will be clear that the end portions of the cord lie between the flanges 20 and the side walls 12. At least one end of the cord extends beyond the end of the flap 13, and the other end may similarly extend out of the container, as shown, or may extend merely to the end of the other flap 13, if desired. The condition of the container and cord at this stage is illustrated in Figure 4. The flaps 13 are now swung to closed position and adhesively or otherwise secured to the inner flap 16. When it is desired to open the container, it is only necessary to grasp one of the protruding ends of the cord and pull on the cord to sever the container along the hinge lines of the flaps 13 and 16. It will be noted that the disposition of the cord as described requires the severance of only one thickness of material by the cord in order to open the box. This makes the opening of the container a surprisingly quick and easy operation.

If the cord is disposed along only three walls of the container, as shown in the illustrated embodiment, the fourth wall remains intact and the hinge line between the flap and wall serves as a hinge for a cover composed of the united inner and outer flaps. The flanges 20 of the inner flaps 16 are available for frictionally engaging the side walls to hold the cover against dropping into the container if the members 23 are removed, and also aid in preventing entrance of dust or other foreign matter into the container. If desired, of course, the cord may be so disposed as to sever all of the walls of the container, it being merely necessary to lay a portion of the cord along the hinge line of the other inner flap 16 before swinging the flap to closed position. In some cases, such as when the container is formed of particularly tough material, it is advantageous to anchor an end portion of the cord rather than the central portion as described, to avoid any possibility of the cord slipping after the hinge line of the anchoring flap has been severed. In this case it is only necessary to arrange the cord so that it will sever the wall carrying the anchoring flap 16 after the other walls which are to be cut open have been severed.

It will be clear that only one of the flaps 16 need be provided with the side or anchoring flanges 20, and it will also be understood that the cord may be arranged to sever any desired number of the walls of the container. Of course, the invention finds its greatest application in the common type of four-walled rectangular container, but containers of other shapes and numbers of walls may embody the principles of the invention.

It will be obvious that various changes and modifications in the structure illustrated and described may be made without departing from the principles of the invention. Some of these possible changes and modifications have been pointed out in the foregoing description, and others will readily suggest themselves to those skilled in the art. In view of the variations which may be made in the structure employed to embody the invention, it is not intended to limit the invention to the specific embodiment illustrated and described, but only as required by the spirit and scope of the appended claims.

I claim:

1. A paperboard container comprising two pairs of opposed side walls, the walls of one pair being separately formed and secured extending between the other walls, a pair of substantially rectangular inner cover flaps each integral with and hinging on one of said separate walls and extending from wall to wall of the other pair of walls, an end flange on the free edge of each inner flap paralleling the hinge line, said free edges abutting in closed position of said inner flaps, side flanges on the other free edges having ends adjacent the hinge line, outer cover flaps hinged on the other side walls adapted to overlie the inner cover flaps in closed position, a pair of tubular members in said container arranged to receive therebetween said end flanges of said inner flaps in frictional relation and defining with said other side walls spaces for receiving said side flanges, each of said tubular members being adapted and disposed to support one of said inner flaps in closed position, means for securing said flaps together in closed position, and a rip cord having a grasping portion protruding from said container and an inner portion disposed in said container adjacent the hinge lines of at least two adjacent cover flaps and between the side walls and said side flanges, said cord being clamped between said side flange ends and the adjacent surface of said container when said inner flaps are in closed position.

2. A paperboard container comprising two pairs of opposed side walls, the walls of one pair being separately formed and reinforcingly secured to the ends of the other walls, a substantially rectangular inner cover flap integrally hinged on each of said separate walls, each inner flap having substantially parallel edges and a free edge extending between said parallel edges, said parallel edges engaging said other walls and said free edges abutting each other in closed position of said inner flaps, flanges on said parallel edges each having one end adjacent the hinge line, outer cover flaps hinged on said other side walls adapted to overlie said inner cover flaps in closed position, a plurality of tubular members in said container supporting said inner flaps in closed position, means securing said inner and outer flaps together in closed position, and a rip cord for opening said container disposed therein along the hinge lines of at least two adjacent flaps with a grasping portion extending out of the container, said cord being anchored by engagement between the ends of said flanges of at least one of said inner cover flaps and the adjacent surface of the container when said inner flaps are in closed position.

3. In a paperboard container comprising two pairs of opposed side walls, the walls of one pair being separately formed and reinforcingly secured to the ends of the other walls, the improvement comprising, in combination, inner cover flaps integrally hinged on said separate walls and having free edges abutting over the interior of the container in closed position, a depending flange on said abutting edge of each inner flap, a clamping flange on at least one other edge of said inner flap having one end adjacent the hinge line thereof, a plurality of tubular members in said container arranged to receive between two of said members the depending flanges and between said members and said other side walls the clamping flanges and to support said inner flaps in closed position, an outer cover flap hinged on each of said other walls for overlying said inner flaps, means for securing said inner and outer flaps together in closed position, and means for opening said container when closed comprising a rip cord disposed with a grasping portion extending out of the container and an inner portion lying along the hinge lines of at least two adjacent flaps frictionally secured by engagement between said end of said clamping flange and the adjacent container surface, and the part of said inner portion lying along the hinge line of an outer cover flap being disposed between said clamping flanges and the other said wall to which said outer flap is hinged.

4. In a paperboard container comprising two pairs of opposed side walls, the walls of one pair being separately formed and each reinforcingly secured to the ends of the other walls, the improvement comprising, in combination, inner cover flaps integral with and hinged on said separate walls, said inner flaps having free end edges abutting each other and side edges abutting said other walls in closed position to prevent relative movement of said side walls, flanges on the side edges and free end edge of each inner flap, a pair of tubular members in said container each supporting one of said inner flaps in closed position to hold said inner flaps in a substantially common plane, said tubular members being adapted to receive said end edge flanges in frictional engagement therebetween and said side edge flanges in frictional engagement between said members and said other walls, at least one of said other walls having an outer cover flap hinged thereon adapted to overlie said inner flaps in closed position, and means securing said inner and outer flaps together against relative lateral movement and against movement of said inner flaps out of said common plane.

5. A paperboard container comprising two pairs of opposed side walls, the walls of one pair being separately formed and each reinforcingly secured to the ends of the other walls, inner cover flaps integral with and hinged on said separate walls, said inner flaps having free end edges abutting each other and side edges abutting said other walls in closed position to prevent relative movement of said side walls, flanges on the side edges and free end edges of each inner flap, a plurality of tubular members of said container adapted to support said inner flaps in a substantially common plane in closed position and adapted to receive said end edge flanges frictionally between at least two of said members, at least one of said other walls having an outer cover flap hinged thereon adapted to overlie said inner flaps in closed position, and means securing said inner and outer flaps together against relative lateral movement and against movement of said inner flaps out of said common plane.

6. A paperboard container comprising a plurality of pairs of opposed side walls, inner cover flaps hinged on the walls of one pair and adapted to abut each other at the free ends thereof in closed position, flanges on the side edges of said inner flaps, a plurality of tubular members in said container engaging said inner flaps to maintain said flaps in a substantially common plane in closed position and having walls substantially paralleling the other side walls of the container and spaced therefrom for reception therebetween of said flanges, at least one of said other walls having an outer cover flap hinged thereon adapted to overlie said inner flaps in closed position, and means securing said inner and outer flaps together.

7. A paperboard container comprising two pairs of opposed side walls, a substantially rectangular inner cover flap hinged on each wall of one of said pairs and having substantially parallel edges and a free edge extending between said parallel edges, said parallel edges engaging the other walls and said free edges abutting each other in closed position of said inner flaps, flanges on said parallel edges each having one end adjacent the hinge line, an outer cover flap hinged on another side wall and adapted to overlie said inner cover flaps in closed position, a plurality of tubular members in said container supporting said inner flaps in closed position, means securing said inner and outer flaps together in closed position, and a rip cord for opening said container disposed therein along the hinge lines of at least two adjacent flaps with a grasping portion extending out of the container, said cord being anchored by engagement between the ends of said flaps of at least one of said inner cover flaps and the adjacent surface of the container when said inner flaps are in closed position.

8. In a paper board container comprising two pairs of opposed side walls, the improvement comprising, in combination, inner cover flaps hinged on the walls of one pair and having free edges abutting over the interior of the container in closed position, a depending flange on said abutting edge of each inner flap, a clamping flange on at least one other edge of said inner flap having one end adjacent the hinge line thereof, a plurality of tubular members in said container arranged to receive between two of said members the depending flanges and between said members and said other side walls the clamping flanges and to support said inner flaps in closed position, an outer cover flap hinged on another of said side walls for overlying said inner flaps, means for securing said inner and outer flaps together in closed position, and means for opening said container when closed comprising a rip cord disposed with a grasping portion extending out of the container and an inner portion lying along the hinge lines of at least two adjacent flaps frictionally secured by engagement between said end of said clamping flange and the adjacent container surface, and the part of said inner portion lying along the hinge line of an outer cover flap being disposed between said clamping flanges and the other said wall to which said outer flap is hinged.

9. A paperboard container comprising two pairs of opposed side walls, inner cover flaps hinged on the walls of one pair, said inner flaps having free end edges abutting each other and side edges abutting the other walls in closed position, flanges on the side edges and free end edges of each inner flap, a plurality of tubular members in said container adapted to support said inner flaps in a substantially common plane in closed position and spaced from each other and from one of said pairs of side walls to receive said end edge flanges frictionally between at least two of said members and said side edge flanges between said members and said one pair of side walls, at least one of said other walls having an outer cover flap hinged thereon adapted to overlie said inner flaps in closed position, and means securing said inner and outer flaps together against relative lateral movement and against movement of said inner flaps out of said common plane.

10. A paperboard container comprising two pairs of opposed side walls, a substantially rectangular inner cover flap hinged on each wall of one of said pairs, a flange on each side edge of said flaps, a plurality of tubular support members defining compartments in the container and arranged to provide with the walls of the other of said pairs channels for said flanges, extension means on the inner edges of said flaps cooperable with said support means to hold said flaps in closed position against movement into the container, and an outer cover flap hinged on a wall of said other pair and holding said inner flaps in position closing open ends of said compartments.

11. A paperboard container comprising; a main blank when set up providing a bottom, side walls and outer cover flaps each about one half the width of said bottom; a pair of blanks each when set up providing an end wall having bottom and side flanges and an inner cover flap whose width is about one half the length of said bottom of said main blank and having side and end flanges; fastening means securing said bottom and side flanges of each end wall to the ends respectively of said bottom and side walls, and a pair of tubular members of about the same height as said end walls and spaced from said side walls to provide channels for receiving said side flanges of said inner cover flaps, said end flanges of said inner cover flaps cooperating with the juxtaposed walls of said tubular members to prevent movement of said inner cover flaps into said tubular members, said outer cover flaps overlying and secured to said inner cover flaps when the container is closed.

*12. A paperboard container comprising a box-like body having a bottom wall and opposed side and end walls, substantially rectangular inner cover flaps hinged on said end walls, flanges on the side edges of said inner cover flaps, a rectangular tubular member of approximately the same height as the interior of said body fitting within and reinforcing the latter, said tubular member having side walls disposed in close proximity to said side walls of said body for reception therebetween of said flanges, and an outer cover flap hinged on one of said side walls of said body, said inner cover flaps seating on said side walls of said tubular member with their flanges fitting between the latter walls and said side walls of said body and said outer cover flap overlying said inner cover flaps and holding them closed, when all of said flaps are closed.*

*13. A paperboard container comprising a box-like body having a bottom wall and opposed side and end walls, substantially rectangular inner cover flaps hinged on said end walls, flanges on the side edges of said inner cover flaps, a rectangular tubular reinforcing means of approximately the same height as the interior of said body fitting within and reinforcing the latter, said reinforcing means being free from said body and having end walls disposed in close proximity to said end walls of said body and side walls disposed in close proximity to said side walls of said body for reception therebetween of said flanges, and an outer cover flap hinged on one of said side walls of said body, said inner cover flaps seating on said side walls of said reinforcing means with their flanges fitting between the latter walls and said side walls of said body and said outer cover flap overlying said inner cover flaps and holding them closed, when all of said flaps are closed.*

*14. A paperboard container comprising a box-like body having a bottom wall and opposed side and end walls, substantially rectangular inner cover flaps hinged on said end walls, flanges on the side edges of said inner cover flaps, a rectangular tubular reinforcing means of approximately the same height as the interior of said body fitting within and reinforcing the latter, said reinforcing means being free from said body and comprising a member formed from a single strip of paperboard folded transversely and having its ends secured together to provide end walls and side walls, said reinforcing means having end walls disposed in close proximity to said end walls of said body and side walls disposed in close proximity to said side walls of said body for reception therebetween of said flanges, and an outer cover flap hinged on one of said side walls of said body, said inner cover flaps seating on said side walls of said reinforcing means with their flanges fitting between the latter walls and said side walls of said body and said outer cover flap overlying said inner cover flaps and holding them closed, when all of said flaps are closed.*

MELVIN T. HUNSWORTH.

REFERENCES CITED

The following references are of record in the file of this patent or the original patent:

UNITED STATES PATENTS

| Number | Name | Date |
|---|---|---|
| 147,697 | Smith | Feb. 17, 1874 |
| 724,384 | Ferres | Mar. 31, 1903 |
| 1,672,634 | Walter | June 5, 1928 |
| 1,697,969 | Boeye | Jan. 8, 1929 |
| 1,724,224 | Schroeder | Aug. 13, 1929 |
| 2,012,132 | Koppelman et al. | Aug. 20, 1935 |
| 2,297,982 | Potts | Oct. 6, 1942 |
| 2,340,394 | Limbert et al. | Feb. 1, 1944 |
| 2,404,704 | Guyer | July 23, 1946 |
| 2,405,499 | Guyer | Aug. 6, 1946 |